United States Patent
Kang et al.

(10) Patent No.: US 12,039,035 B2
(45) Date of Patent: Jul. 16, 2024

(54) APPARATUS AND METHOD FOR DETECTING VIOLATION OF CONTROL FLOW INTEGRITY

(71) Applicant: ELECTRONICS AND TELECOMMUNICATIONS RESEARCH INSTITUTE, Daejeon (KR)

(72) Inventors: Dong-Wook Kang, Daejeon (KR); Dae-Won Kim, Daejeon (KR); Ik-Kyun Kim, Daejeon (KR); Sang-Su Lee, Daejeon (KR); Jin-Yong Lee, Daejeon (KR); Byeong-Cheol Choi, Daejeon (KR); Yong-Je Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 17/518,373

(22) Filed: Nov. 3, 2021

(65) Prior Publication Data

US 2022/0269777 A1 Aug. 25, 2022

(30) Foreign Application Priority Data

Feb. 19, 2021 (KR) .......................... 10-2021-0022725

(51) Int. Cl.
*G06F 21/54* (2013.01)
*G06F 9/30* (2018.01)
*G06F 21/55* (2013.01)

(52) U.S. Cl.
CPC .......... *G06F 21/54* (2013.01); *G06F 9/30058* (2013.01); *G06F 9/30101* (2013.01); *G06F 21/554* (2013.01); *G06F 21/556* (2013.01)

(58) Field of Classification Search
None
See application file for complete search history.

(56) References Cited

U.S. PATENT DOCUMENTS 7,861,305 B2 * 12/2010 McIntosh .............. G06F 21/563
713/188
8,136,091 B2 * 3/2012 Erlingsson .......... G06F 9/30061
717/121

(Continued)

FOREIGN PATENT DOCUMENTS

KR 10-2017-0055933 A 5/2017
KR 10-2019-0048590 A 5/2019

OTHER PUBLICATIONS

Das, et al., A Fine-Grained Control Flow Integrity Approach Against Runtime Memory Attacks for Embedded Systems; IEEE (Year: 2016).*

(Continued)

*Primary Examiner* — Dant B Shaifer Harriman
*Assistant Examiner* — Mahabub S Ahmed
(74) *Attorney, Agent, or Firm* — Rabin & Berdo, P.C.

(57) ABSTRACT

Disclosed herein are an apparatus and method for detecting violation of control flow integrity. The apparatus includes memory for storing a program and a processor for executing the program, wherein the processor multiple branch identifier registers to which identifiers of branch targets are written, a set branch identifier instruction configured to command an identifier of a branch target to be written to a branch identifier register at a predetermined sequence number, among the multiple branch identifier registers, and a check branch identifier instruction configured to command a signal indicating detection of a control flow hijacking attack to be issued based on whether a value written to the branch identifier register at the predetermined sequence number is identical to a value of an identifier of a branch target at the (Continued)

predetermined sequence number, wherein the program detects whether a control flow is hijacked based on the multiple branch identifier registers.

12 Claims, 6 Drawing Sheets

(56) References Cited

U.S. PATENT DOCUMENTS

| | | | | |
|---|---|---|---|---|
| 10,409,600 | B1* | 9/2019 | Sierra | G06F 12/1408 |
| 11,120,130 | B2* | 9/2021 | Gleeson | G06F 21/57 |
| 11,327,755 | B2* | 5/2022 | Hu | G06F 9/384 |
| 11,635,965 | B2* | 4/2023 | Brandt | G06F 9/3806 |
| | | | | 712/239 |
| 11,755,731 | B2* | 9/2023 | Favor | G06F 9/30189 |
| | | | | 726/22 |
| 2004/0133777 | A1* | 7/2004 | Kiriansky | G06F 21/554 |
| | | | | 713/166 |
| 2008/0189530 | A1* | 8/2008 | McIntosh | G06F 21/563 |
| | | | | 712/E9.016 |
| 2008/0256346 | A1* | 10/2008 | Lee | G06F 21/566 |
| | | | | 712/E9.016 |
| 2012/0255012 | A1* | 10/2012 | Sallam | G06F 21/554 |
| | | | | 726/23 |
| 2013/0024676 | A1* | 1/2013 | Glew | G06F 9/30061 |
| | | | | 712/E9.06 |
| 2013/0283245 | A1* | 10/2013 | Black | G06F 9/44589 |
| | | | | 717/130 |
| 2015/0356294 | A1* | 12/2015 | Tan | G06F 21/53 |
| | | | | 726/22 |
| 2015/0370560 | A1* | 12/2015 | Tan | G06F 21/54 |
| | | | | 717/148 |
| 2017/0140148 | A1* | 5/2017 | Gleeson | G06F 21/125 |
| 2018/0225446 | A1* | 8/2018 | Liu | G06F 21/577 |
| 2019/0042745 | A1* | 2/2019 | Chen | G06V 20/62 |
| 2019/0042760 | A1* | 2/2019 | Gutson | G06F 21/54 |
| 2019/0205136 | A1* | 7/2019 | Hu | G06F 9/35 |
| 2019/0324756 | A1* | 10/2019 | Chappell | G06F 9/3858 |
| 2020/0210197 | A1* | 7/2020 | Asanovic | G06F 21/74 |
| 2020/0409711 | A1* | 12/2020 | Constable | G06F 9/30145 |
| 2022/0019657 | A1* | 1/2022 | Sethumadhavan | G06F 21/52 |
| 2022/0027461 | A1* | 1/2022 | Bhat | G06F 12/1433 |
| 2022/0198000 | A1* | 6/2022 | Weiss | G06F 21/79 |
| 2022/0206961 | A1* | 6/2022 | Lempel | G06F 12/1441 |

OTHER PUBLICATIONS

Arora et al.; Hardware-Assisted Run-Time Monitoring for Secure Program Execution on Embedded Processors; IEEE (Year: 2006).*
Criswell et al.; KCoFI: Complete Control-Flow Integrity for Commodity Operating System Kernels; IEEE (Year: 2014).*
Lucas Davi et al., "Hardware-Assisted Fine-Grained Control-Flow Integrity: Towards Efficient Protection of Embedded Systems Against Software Exploitation", DAC '14: Proceedings of the 51st Annual Design Automation Conference, Jun. 1, 2014.
Ruan De Clercq et al., "A survey of Hardware-based Control Flow Integrity (CFI)", Computer Science, Jun. 22, 2017.

* cited by examiner

FIG. 1

| INSTRUCTION (120) | 31 30 29 28 27 26 25 24 | 23 22 21 20 | 19 18 17 16 15 14 13 12 | 11 10 9 8 | 7 6 5 4 3 2 | 1 0 |
|---|---|---|---|---|---|---|
| setBID BIDR_idx, BID_base, offset (121) | RSVD BRANCH ID BASE | BIDR FIELD # | OFFSET | SLTI | rd=x0 | OP-IMM |
| | 0 0 0 0 0 0 0 0 | 0 | 0 1 0 0 0 0 0 0 | 0 0 1 0 | 0 0 0 0 1 0 | 1 1 |
| chkBID BIDR_idx BID (123) | 0 0 0 0 0 0 0 0 | BRANCH ID | BIDR FIELD # | SLTI | rd=x0 | OP-IMM |
| | 0 0 0 0 0 0 0 0 | 0 | 1 0 1 0 0 0 0 0 | 0 0 1 0 | 0 0 0 0 1 0 | 1 1 |

| REGISTERS (110) | 31 30 29 28 27 26 25 24 | 23 22 21 20 19 18 17 16 | 15 14 13 12 11 10 9 8 | 7 6 5 4 3 2 1 0 |
|---|---|---|---|---|
| BRANCH ID REG 0 (0-3) | BIDR FIELD 3 | BIDR FIELD 2 | BIDR FIELD 1 | BIDR FIELD 0 |

APPARATUS AND METHOD FOR DETECTING VIOLATION OF CONTROL FLOW INTEGRITY

CROSS REFERENCE TO RELATED APPLICATION

This application claims the benefit of Korean Patent Application No. 10-2021-0022725, filed Feb. 19, 2021, which is hereby incorporated by reference in its entirety into this application.

BACKGROUND OF THE INVENTION

1. Technical Field

The following embodiments relate to technology for detecting violation of control flow integrity of software.

2. Description of the Related Art

A control-hijacking-based attack is intended to falsify control flow by exploiting software vulnerabilities and allow an attacker to perform a desired function. In order to detect this, Control Flow Integrity (CFI) technology for securing the integrity of control flow of software has been introduced.

Initial CFI technology was implemented based on software without hardware in support thereof, and thus had the disadvantage of imposing a large performance overhead. Thereafter, a CFI-support function was added to the architecture of commercial Central Processing Units (CPUs) such as Intel or ARM processors, whereby the performance of CFI technology has been improved, but the CFI precision provided thereby is not high. Here, "CFI precision" denotes the extent to which the intention of a software developer is reflected in CFI test standards. As CFI precision is higher, the number of cases of control flow falsification that can be detected may increase, whereas as CFI prediction is lower, the number of cases that cannot be detected may increase, with the result that the possibility of a successful attack increases.

Thus, CPU architecture extension technology for improving CFI precision without exceeding an allowable performance overhead is required.

SUMMARY OF THE INVENTION

An embodiment is intended to improve control flow integrity precision without exceeding an allowable performance overhead.

In accordance with an aspect, there is provided an apparatus for detecting violation of control flow integrity, including memory for storing at least one program, and a processor for executing the program, wherein the processor includes multiple branch identifier (ID) registers to which identifiers of branch targets are written, a set branch identifier (setBID) instruction configured to command an identifier of a branch target to be written to a branch identifier register at a predetermined sequence number, among the multiple branch identifier registers, and a check branch identifier (chkBID) instruction configured to command a signal indicating detection of a control flow hijacking attack to be issued based on whether a value written to the branch identifier register at the predetermined sequence number is identical to a value of an identifier of a branch target at the predetermined sequence number, wherein the program is configured to detect whether a control flow is hijacked based on the multiple branch identifier registers.

The set branch identifier (setBID) instruction may include, as operands, a branch identifier register sequence number (BIDR_idx), a branch identifier base (BID_base), and a branch identifier offset (BID_offset).

The check branch identifier (chkBID) instruction may include, as operands, a branch identifier register sequence number (BIDR_idx) and a branch identifier (BID).

The program may be configured to write different identifiers, respectively allocated to multiple branch targets in a predetermined control flow, to the multiple branch identifier registers depending on sequence numbers in response to the set branch identifier (setBID) instruction, and detect whether a control flow hijacking attack has been attempted based on whether an identifier of a branch target that is called in response to the check branch identifier (chkBID) instruction is identical to an identifier written to a branch identifier register at a predetermined sequence number corresponding to the called branch target.

The program may be configured to, when the control flow is a control flow in which each of two or more first functions branches to at least one of two or more second functions, allocate different identifiers to respective second functions, and determine whether at least one of the two or more first functions calls an identifier of a second function that does not correspond to the control flow, thus detecting whether the control flow is hijacked.

The program may be configured to, when the control flow is a control flow in which one of two or more functions is called using a function pointer array, allocate different identifiers to the two or more functions, respectively, based on an index of the function pointer array, and determine whether an identifier of a function that does not correspond to an index of the function pointer array is called, thus detecting whether the control flow is hijacked.

The program may be configured to, when the control flow is a control flow in which a function branches to one of two or more targets using a conditional branch statement, allocate different identifiers to the two or more targets, respectively, based on a conditional variable of the conditional branch statement, and determine whether an identifier of a target that does not correspond to the conditional variable of the conditional branch statement is called, thus detecting whether the control flow is hijacked.

In accordance with another aspect, there is provided a method for detecting violation of control flow integrity, the method being performed by an apparatus including a processor for executing a program, wherein the processor includes a set branch identifier (setBID) instruction configured to command an identifier of a branch target to be written to a branch identifier register at a predetermined sequence number, among multiple branch identifier registers, and a check branch identifier (chkBID) instruction configured to command a signal indicating detection of a control flow hijacking attack to be issued based on whether a value written to the branch identifier register at the predetermined sequence number is identical to a value of an identifier of a branch target at the predetermined sequence number, and the method is configured to detect whether a control flow is hijacked based on the multiple branch identifier registers.

The set branch identifier (setBID) instruction may include, as operands, a branch identifier register sequence number (BIDR_idx), a branch identifier base (BID_base), and a branch identifier offset (BID_offset).

The check branch identifier (chkBID) instruction may include, as operands, a branch identifier register sequence number (BIDR_idx) and a branch identifier (BID).

The method may include writing different identifiers, respectively allocated to multiple branch targets in a predetermined control flow, to the multiple branch identifier registers depending on sequence numbers in response to the set branch identifier (setBID) instruction, and detecting whether a control flow hijacking attack has been attempted based on whether an identifier of a branch target that is called in response to the check branch identifier (chkBID) instruction is identical to an identifier written to a branch identifier register at a predetermined sequence number corresponding to the called branch target.

The method may include, when the control flow is a control flow in which each of two or more first functions branches to at least one of two or more second functions, allocating different identifiers to respective second functions, and determining whether at least one of the two or more first functions calls an identifier of a second function that does not correspond to the control flow, thus detecting whether the control flow is hijacked.

The method may include, when the control flow is a control flow in which one of two or more functions is called using a function pointer array, allocating different identifiers to the two or more functions, respectively, based on an index of the function pointer array, and determining whether an identifier of a function that does not correspond to an index of the function pointer array is called, thus detecting whether the control flow is hijacked.

The method may include, when the control flow is a control flow in which a function branches to one of two or more targets using a conditional branch statement, allocating different identifiers to the two or more targets, respectively, based on a conditional variable of the conditional branch statement, and determining whether an identifier of a target that does not correspond to the conditional variable of the conditional branch statement is called, thus detecting whether the control flow is hijacked.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and a method according to embodiments will be described in detail with reference to FIGS. 1 to 8.

Figure 1:
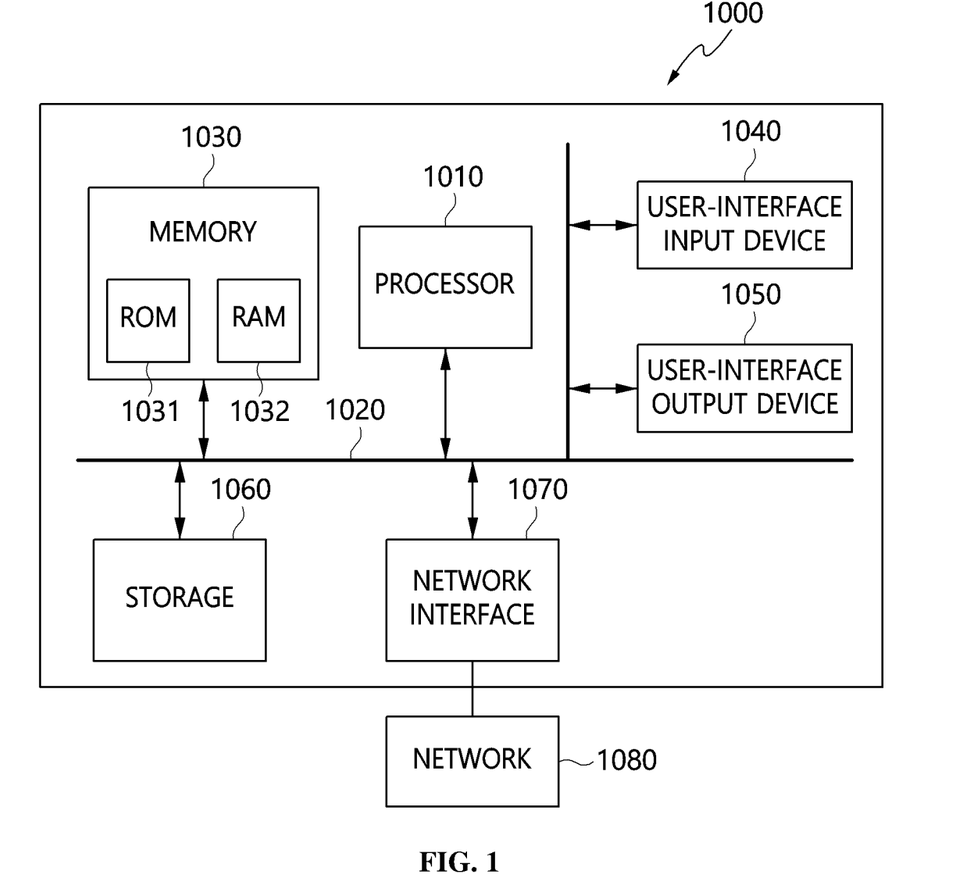
FIG. 1 is a diagram illustrating the configuration of a computer system according to an embodiment.

FIG. 1 is a diagram illustrating the configuration of a computer system according to an embodiment.

An apparatus for detecting violation of control flow integrity according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032

Each processor 1010 may be a Central Processing Unit (CPU) or a semiconductor device for executing programs or processing instructions stored in the memory 1030 or the storage 1060.

The processor 1010 may control multiple hardware or software components connected to the processor 1010 by executing an operating system (OS) or an application, and may perform processing or operations on various types of data. The processor 1010 includes multiple registers which load and process machine instructions, each composed of instruction sets. The registers described in the present specification are important components for implementing system purposes, and are different from the various types of memory described in the present specification.

The processor 1010 may be implemented as a System on a Chip (SoC). According to an embodiment of the present invention, the processor 1010 may further include a Graphics Processing Unit (GPU) and/or an Image Signal Processor (ISP). The processor 1010 may load an instruction or data received from at least one additional component (for example, nonvolatile memory), process the loaded instruction or data, and store various types of data in the nonvolatile memory.

Figure 2:
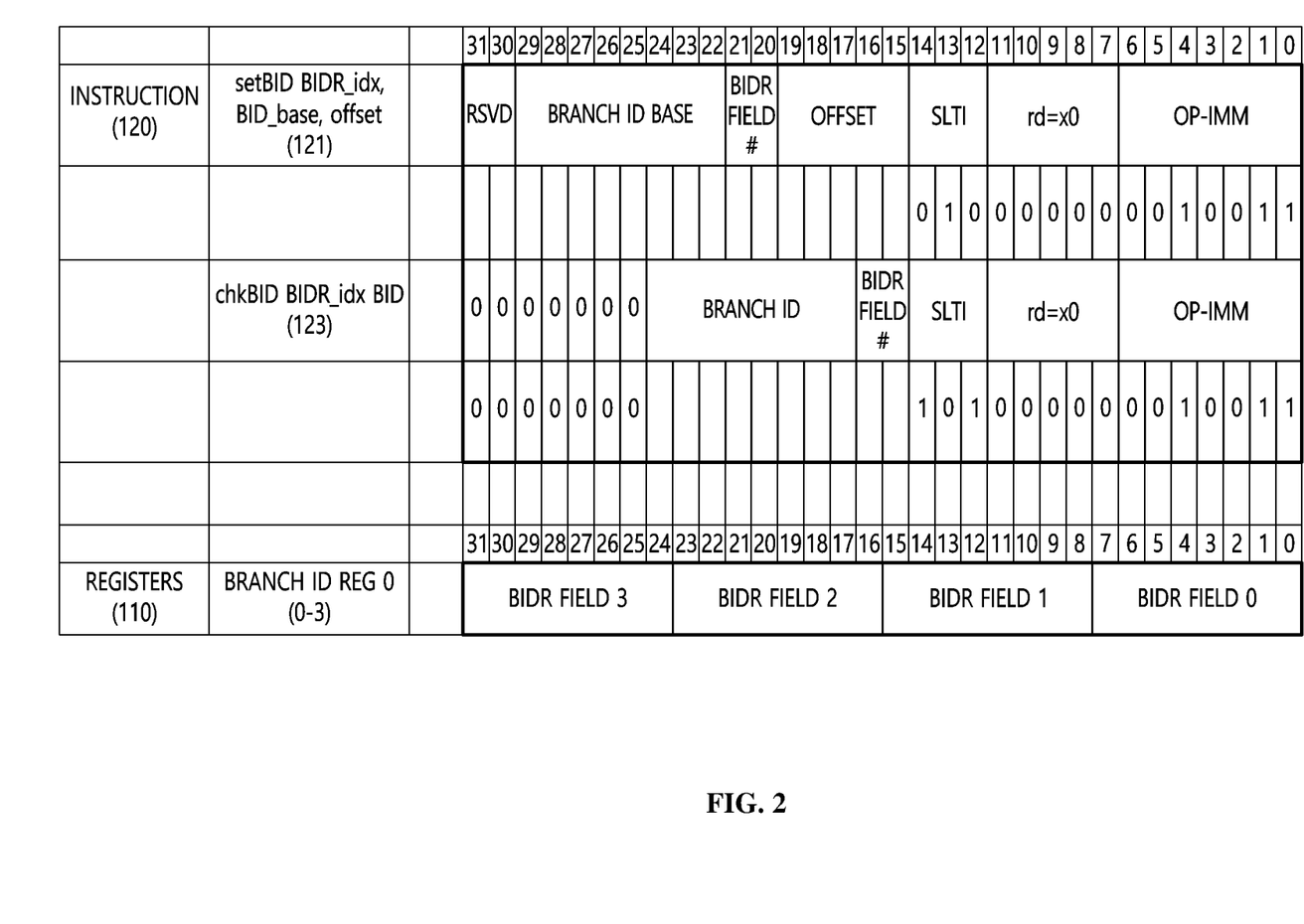
FIG. 2 is a diagram illustrating an extension structure of a processor for detecting violation of control flow integrity according to an embodiment.

In an embodiment, the processor 1010 may be extended so as to detect violation of control flow integrity in the computer system 1000, such as that illustrated in FIG. 1, FIG. 2 is a diagram illustrating an extension structure of a processor for detecting violation of control flow integrity according to an embodiment.

Referring to FIG. 2, a register 110 and an instruction 120 used to detect violation of control flow integrity may be added to the processor 1010.

Here, the added register 110 may be a branch identifier (ID) register used to dynamically write and test the identifier (ID) of a branch target.

In an embodiment, as illustrated in FIG. 2, as the branch identifier register, multiple branch identifier registers BIDR_0, BIDR_1, BIDR_2, . . . , BIDR_n may be added.

The added instruction 120 may include a set branch identifier (setBID) instruction 121 and a check branch identifier (chkBID) instruction 123.

Among the instructions, the set branch identifier (setBID) instruction 121 has three operands, namely a branch ID register sequence number (BIDR_idx), a branch ID base (BID_base), and a branch ID offset (BID_offset). The setBID instruction is an instruction commanding BID_base and BID_offset values to be written to a branch ID register at an x-th sequence number (i.e., an x-th sequential position).

Here, BID_offset may have a value that is determined at runtime, and may then be utilized to increase CFI precision in consideration of dynamic information.

Meanwhile, the check branch ID (chkBID) instruction 123 has two operands, namely a branch ID register sequence number (BIDR_idx) and a branch identifier (BID). This must appear in the target address of an indirect branch, and is an instruction that commands the issuance of a signal indicating that a control-hijacking attack has been detected based on whether the value of a branch identifier register at an x-th sequence number is identical to that of a branch identifier (BID).

In an embodiment, the method for detecting violation of control flow integrity may be performed by the extended processor, as illustrated in FIG. 2. That is, based on the multiple branch ID registers 110, the set branch ID (setBID) instruction 121 and the check branch ID (chkBID) instruction 123 may be executed, and thus whether control flow is hijacked may be detected.

Figure 3:
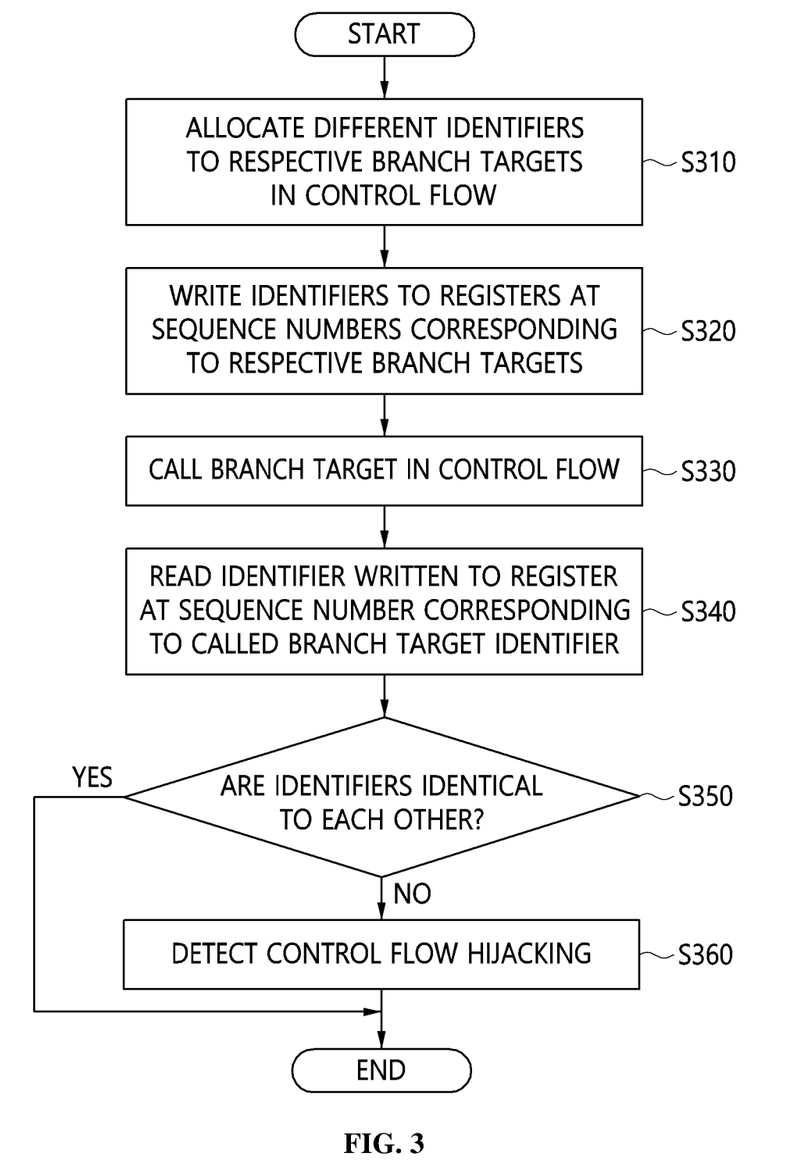
FIG. 3 is a flowchart illustrating a method for detecting violation of control flow integrity according to an embodiment.

FIG. 3 is a flowchart illustrating a method for detecting violation of control flow integrity according to an embodiment.

Referring to FIG. 3, the method for detecting violation of control flow integrity according to the embodiment may include steps S310 and S320 of writing different identifiers, allocated to respective multiple branch targets in a predetermined control flow, to multiple branch identifier registers depending on sequence numbers in response to a set branch ID (setBID) instruction, and steps S330 to S360 of detecting whether a control flow hijacking attack has been attempted based on whether the identifier of each branch target called in response to a check branch identifier (chkBID) instruction is identical to an identifier written to a branch identifier register at a predetermined sequence number corresponding to the called branch target.

In order to detect violation of control flow integrity according to the above-described embodiment, code can be configured as shown in the following three embodiments based on the extension structure of the processor.

First Embodiment

The first embodiment is described based on an example applied to control flow in which a function caller_a branches to two functions, that is, callee_1 and callee_2, and in which a function caller_b branches to a callee_1 will be described below.

First, in the conventional technology, for the above-described case, code such as that shown in the following Table 1 can be configured.

TABLE 1

| |
|---|
| void callee_1 ( ) { chkBID BID_A ... } void callee_2 ( ) { chkBID BID_A ... } void caller_a ( ) { setBID BID_A ... } void caller_b ( ) { setBID BID_A ... } |

Referring to Table 1, in the conventional technology, the same identifier (ID), that is, BID_A, is allocated to two functions callee_1 and callee_2.

Therefore, at the time point at which the functions caller_a and caller_b are called, the same identifier, that is, BID_A, is used to verify control flow integrity. Therefore, a problem may arise in that, even if the control flow in which the function caller_b branches to the function callee_1 is changed to control flow in which the function caller_b calls the function callee_2 due to control flow hijacking, the control flow change cannot be detected at the time of detecting control flow integrity. The first embodiment of the present invention is configured to solve the above-described problem.

Figure 4:
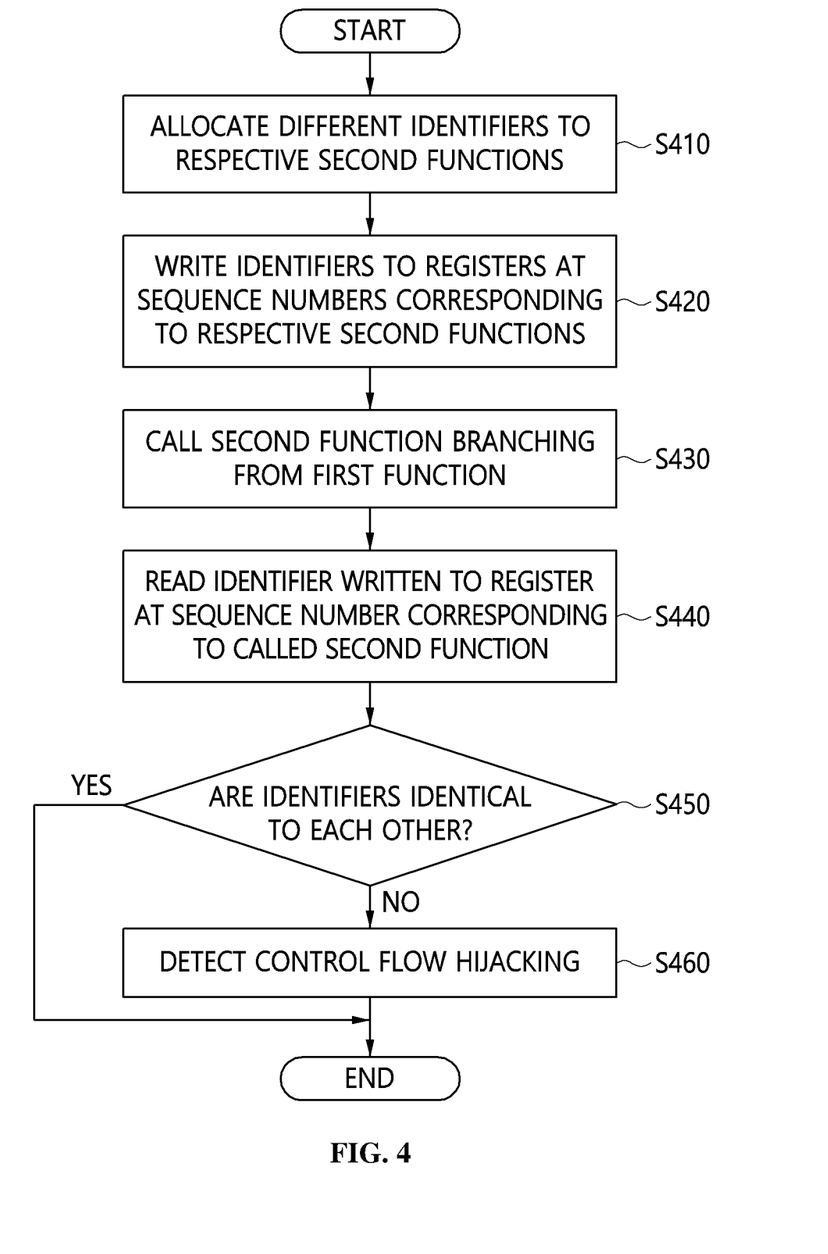
FIG. 4 is a flowchart illustrating a method for detecting violation of control flow integrity according to a first embodiment.

FIG. 4 is a flowchart illustrating a method for detecting violation of control flow integrity according to a first embodiment.

Referring to FIG. 4, the method for detecting violation of control flow integrity according to the first embodiment may include steps S410 and S420 of, when current control flow is control flow in which each of two or more first functions branches to at least one of two or more second functions, allocating different identifiers to respective second functions, and steps S430 to S460 of determining whether at least one of the two or more first functions calls the identifier of a second function that does not correspond to the control flow, and then detecting whether the control flow is hijacked.

That is, in the first embodiment, in order to solve the conventional problem, code such as that shown in the following Table 2 may be configured.

TABLE 2

```
void callee_1 ( ) {
   chkBID BIDR_1, BID_A
   ...
}
void callee_2 ( ) {
   chkBID BIDR_2, BID_B
   ...
}
void caller_a ( ) {
   setBID BIDR_1, BID_A, 0
   setBID BIDR_2, BID_B, 0
   ...
}
void caller_b ( ) {
   setBID BIDR_1, BID_A, 0
   ...
}
```

Referring to Table 2, different identifiers, that is, BID_A and BID_B, may be allocated to functions callee_1 and callee_2, respectively.

Therefore, at the time point at which the functions caller_a and caller_b are called, the function caller_a executes a set branch ID (setBID) instruction for BID_A and BID_B and is allowed to call the functions callee_1 and callee_2, and the function caller_b executes a set branch ID (setBID) instruction for BID_A and is allowed to call only the function callee_1.

Accordingly, if the control flow in which the function caller_b branches to the function callee_1 is changed to control flow in which the function caller_b calls the function callee_2 due to control flow hijacking, the caller_b is not allowed to call the function callee_2 at the time of detecting control flow integrity according to the embodiment, thus enabling control flow hijacking to be detected.

Second Embodiment

The second embodiment will be described based on an example applied to control flow in which functions are called using a function pointer array.

First, for the above-described case, in the conventional technology, code such as that shown in the following Table 3 may be configured to apply Control Flow Integrity (CFI).

TABLE 3

```
void fa ( ) {
   chkBID BID_A
   ...
}
void fb ( ) {
   chkBID BID_A
   ...
}
void fc ( ) {
   chkBID BID_A
   ...
}
funcPtr[ ] = {fa, fb, fc};
void caller (int i) {
   fp = funcPtr[i];
   setBID BID_A
   fp ( );
   ...
}
```

In the conventional technology, the value of a branch identifier (BID) in a chkBID instruction and a setBID instruction are merely statically determined, so it is impossible to take dynamic information into consideration. Therefore, referring to Table 3, the same branch identifier, that is, BID_A, is allocated to three functions fa, fb and fc.

Therefore, before functions are called using a function pointer array funcPtr[ ], the branch identifiers are set, wherein all three functions fa, fb and fc are allowed to be called regardless of the value of the index i of the function pointer array.

Therefore, a problem may arise in that, even if control flow in which the function fa is called when the value of the index i is 0 in the function pointer array funcPtr[ ] is changed to control flow in which functions fb and fc are called due to control flow hijacking, the change is not detected at the time of detecting control flow integrity. The second embodiment of the present invention solves the above-described problem.

Figure 5:
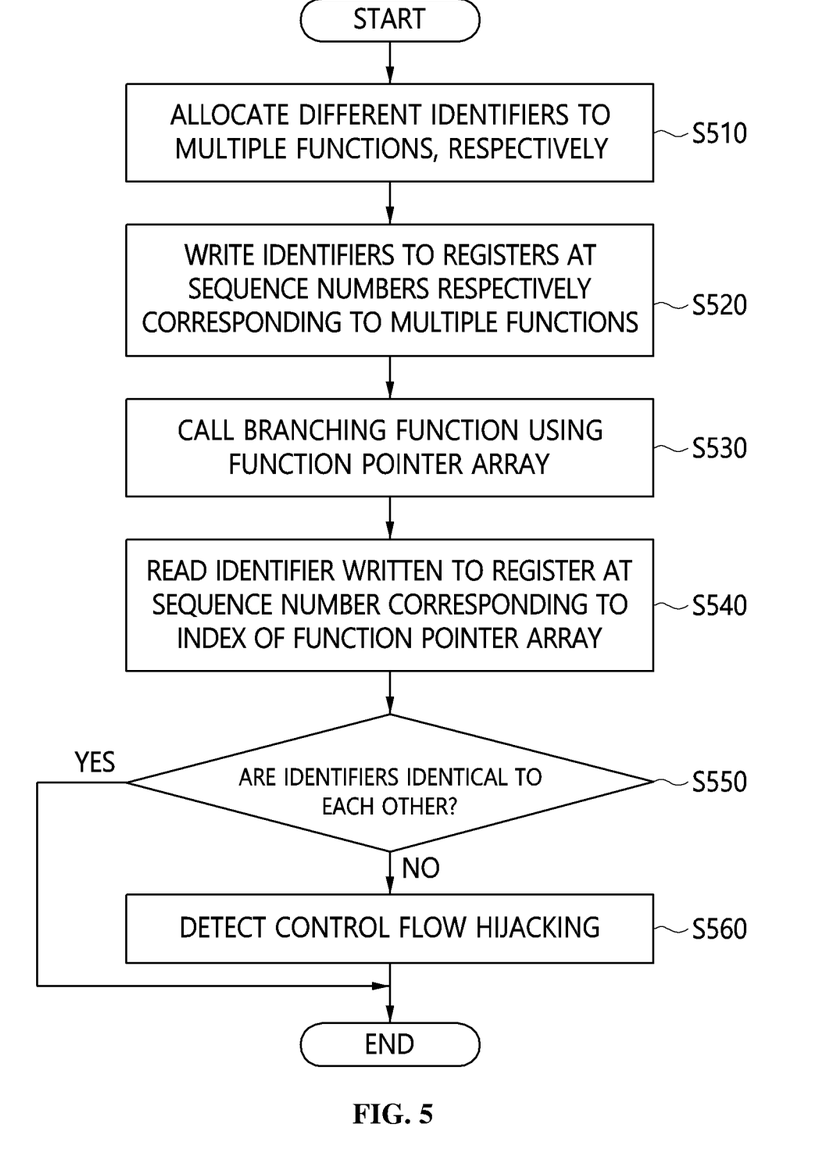
FIG. 5 is a flowchart illustrating a method for detecting violation of control flow integrity according to a second embodiment.

FIG. 5 is a flowchart illustrating a method for detecting violation of control flow integrity according to a second embodiment.

Referring to FIG. 5, the method for detecting violation of control flow integrity according to the second embodiment may include steps S510 and S520 of, when a current control flow is control flow in which one of two or more functions is called using a function pointer array, allocating different identifiers to two or more functions based on the index of the function pointer array, and steps S530 to S560 of determining whether the identifier of a function that does not correspond to the index of the function pointer array is called, and then detecting whether the control flow is hijacked.

That is, in the second embodiment, code such as that shown in the following Table 4 may be configured so as to solve the conventional problem.

TABLE 4

```
void fa (void) {
   chkBID BIDR_0, BID_A
   ...
}
void fb ( ) {
   chkBID BIDR_0, BID_A+1
   ...
}
void fc ( ) {
   chkBID BIDR_0, BID_A+2
   ...
}
funcPtr[ ] = {fa, fb, fc};
void caller (int i) {
   fp = funcPtr[i];
   setBID BIDR_0, BID_A, i
   fp ( );
   ...
}
```

Referring to Table 4, different identifiers, that is, BID_A, BID_A+1, and BID_A+2, are allocated to three functions fa, fb, and fc, respectively. Therefore, when the functions are called using a function pointer array funcPtr[ ], the values of the allocated identifiers are compared with set BID values depending on the index value of the function pointer array funcPtr[ ]. That is, when the value of the index of the function pointer array funcPtr[ ] is 0, only the function fa is allowed to be called.

Therefore, if control flow in which the function fa is called when the value of the index i in the function pointer array funcPtr[ ] is 0 is changed to control flow in which functions fb and fc are called due to control flow hijacking, control flow hijacking may be detected at the time of detecting control flow integrity.

Third Embodiment

The third embodiment will be described based on an example applied to the control flow of a conditional branch statement such as a switch.

First, in the conventional technology, code such as that illustrated in the following Table 5 may be configured for the above-described case.

TABLE 5

```
void func (int i) {
    setBID BID_A
    switch (i) {
    case 0:
        chkBID BID_A;
        ...
    case 1:
        chkBID BID_A;
        ...
    case 2:
        chkBID BID_A;
        ...
    default:
        chkBID BID_A;
        ...
    }
}
```

In the conventional technology, the value of a branch identifier (BID) in a chkBID instruction and a setBID instruction is merely statically determined, so it is impossible to take dynamic information into consideration. Therefore, referring to Table 5, the same branch identifier, that is, BID_A, is allocated to all targets of a conditional branch statement, that is, case 0, case 1, case 2, . . . , default. Further, before a switch statement is executed, respective branch identifiers (BID) of the targets are set.

Therefore, regardless of the value of a conditional variable i in the switch statement, a function is allowed to branch to all targets, that is, case 0, case 1, case 2, . . . , default.

Therefore, a problem may arise in that, even if control flow in which each target is called when the value of the conditional variable i is 0 in the switch statement is changed to control flow in which the function branches to case 1, case2, . . . , default due to control flow hijacking, the change cannot be detected at the time of detecting control flow integrity. The third embodiment of the present invention may solve this problem.

Figure 6:
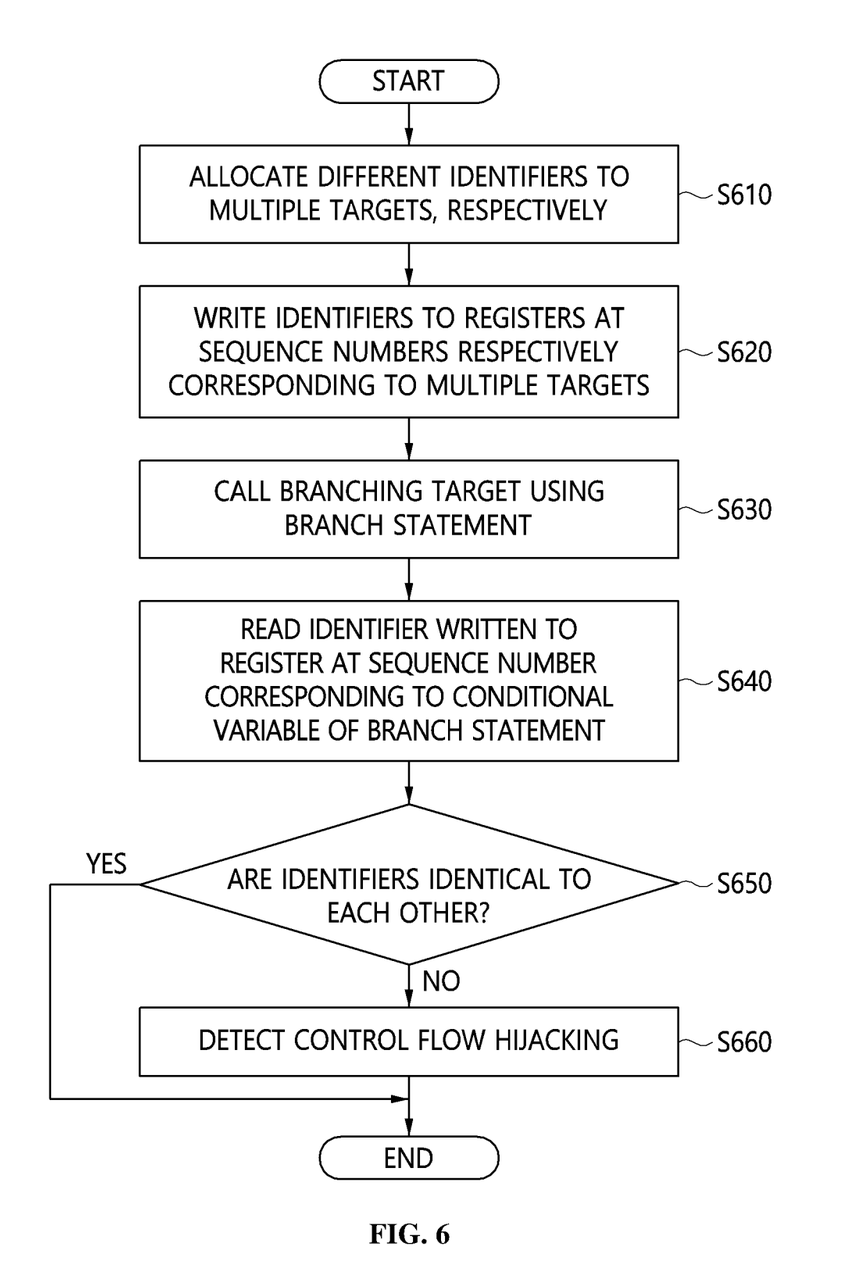
FIG. 6 is a flowchart illustrating a method for detecting violation of control flow integrity according to a third embodiment.

FIG. 6 is a flowchart illustrating a method for detecting violation of control flow integrity according to a third embodiment.

Referring to FIG. 6, the method for detecting violation of control flow integrity according to the third embodiment may include steps S610 and S620 of, when a current control flow is control flow in which a function branches to one of two or more targets through a conditional branch statement, allocating different identifiers to two or more targets based on the conditional variable of the branch statement, and steps S630 to S660 of determining whether the identifier of a target that does not correspond to the conditional variable of the conditional branch statement is called, and thus detecting whether the control flow is hijacked.

Therefore, in the embodiment, in order to solve the above-described conventional problem, code such as that illustrated in the following Table 6 may be configured.

TABLE 6

```
void func (int i) {
    if (0 <= i <= 2)
        setBID BIDR_0, ID_a+i ;
    else
        setBID BIDR_0, ID_a+3;
    switch (i) {
    case 0:
        chkBID BIDR_0, ID_a;
    case 1:
        chkBID BIDR_0, ID_a+1;
    case 2:
        chkBID BIDR_0, ID_a+2;
    default:
        chkBID BIDR_0, ID_a+3;
    }
}
```

Referring to Table 6, different identifiers, that is, BID_a, BID_a+1, BID_a+2, and BID_a+3, are allocated to targets for a branch statement, that is, case 0, case 1, case 2, . . . , default, respectively. Therefore, when a function branches to the cases using the branch statement, the values of the allocated identifiers are compared with set BID values depending on the value of the conditional variable i of the switch statement. That is, when the value of the conditional variable i of the switch statement is 0, branching only to the target case 0 is allowed.

Therefore, if control flow in which the function branches to case 0 when the value of the conditional variable i of the switch statement is 0 is changed to control flow in which the function branches to one of case 1, case 2, . . . , default, due to control flow hijacking, the control flow hijacking may be detected at the time of detecting control flow integrity.

In accordance with the embodiment, control flow integrity precision may be improved without exceeding an allowable performance overhead, thus enabling a control-hijacking attack to be detected with further improved precision.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An apparatus for detecting violation of control flow integrity, comprising:
    a memory for storing at least one program; and
    a processor for executing the program,
    wherein the processor includes:
    multiple branch identifier (ID) registers to which identifiers of branch targets are written;
    a set branch identifier (setBID) instruction configured to command an identifier of a branch target to be written to a branch identifier register at a predetermined sequence number, among the multiple branch identifier registers; and
    a check branch identifier (chkBID) instruction configured to command a signal indicating detection of a control flow hijacking attack to be issued based on whether a value written to the branch identifier register at the predetermined sequence number is identical to a value of an identifier of a branch target at the predetermined sequence number, wherein the program is configured to detect whether a control flow is hijacked based on the multiple branch identifier registers, and wherein the program is configured to:

write different identifiers, respectively allocated to multiple branch targets in a predetermined control flow, to the multiple branch identifier registers depending on sequence numbers in response to the set branch identifier (setBID) instruction; and detect whether a control flow hijacking attack has been attempted based on whether an identifier of a branch target that is called in response to the check branch identifier (chkBID) instruction is identical to an identifier written to a branch identifier register at a predetermined sequence number corresponding to the called branch target.

2. The apparatus of claim 1, wherein the set branch identifier (setBID) instruction includes, as operands, a branch identifier register sequence number (BIDR_idx), a branch identifier base (BID_base), and a branch identifier offset (BID_offset).

3. The apparatus of claim 1, wherein the check branch identifier (chkBID) instruction includes, as operands, a branch identifier register sequence number (BIDR_idx) and a branch identifier (BID).

4. The apparatus of claim 1, wherein the program is configured to, when the control flow is a control flow in which each of two or more first functions branches to at least one of two or more second functions, allocate different identifiers to respective second functions, and determine whether at least one of the two or more first functions calls an identifier of a second function that does not correspond to the control flow, thus detecting whether the control flow is hijacked.

5. The apparatus of claim 1, wherein the program is configured to, when the control flow is a control flow in which one of two or more functions is called using a function pointer array, allocate different identifiers to the two or more functions, respectively, based on an index of the function pointer array, and determine whether an identifier of a function that does not correspond to an index of the function pointer array is called, thus detecting whether the control flow is hijacked.

6. The apparatus of claim 1, wherein the program is configured to, when the control flow is a control flow in which a function branches to one of two or more targets using a conditional branch statement, allocate different identifiers to the two or more targets, respectively, based on a conditional variable of the conditional branch statement, and determine whether an identifier of a target that does not correspond to the conditional variable of the conditional branch statement is called, thus detecting whether the control flow is hijacked.

7. A method for detecting violation of control flow integrity, the method being performed by an apparatus including a memory for storing at least one program and a processor for executing the program, wherein:

the processor includes:

a set branch identifier (setBID) instruction configured to command an identifier of a branch target to be written to a branch identifier register at a predetermined sequence number, among multiple branch identifier registers; and a check branch identifier (chkBID) instruction configured to command a signal indicating detection of a control flow hijacking attack to be issued based on whether a value written to the branch identifier register at the predetermined sequence number is identical to a value of an identifier of a branch target at the predetermined sequence number, and the method is configured to detect whether a control flow is hijacked based on the multiple branch identifier registers, the method further comprising:

writing different identifiers, respectively allocated to multiple branch targets in a predetermined control flow, to the multiple branch identifier registers depending on sequence numbers in response to the set branch identifier (setBID) instruction; and detecting whether a control flow hijacking attack has been attempted based on whether an identifier of a branch target that is called in response to the check branch identifier (chkBID) instruction is identical to an identifier written to a branch identifier register at a predetermined sequence number corresponding to the called branch target.

8. The method of claim 7, wherein the set branch identifier (setBID) instruction includes, as operands, a branch identifier register sequence number (BIDR_idx), a branch identifier base (BID_base), and a branch identifier offset (BID_offset).

9. The method of claim 7, wherein the check branch identifier (chkBID) instruction includes, as operands, a branch identifier register sequence number (BIDR_idx) and a branch identifier (BID).

10. The method of claim 7, comprising:

when the control flow is a control flow in which each of two or more first functions branches to at least one of two or more second functions, allocating different identifiers to respective second functions, and determining whether at least one of the two or more first functions calls an identifier of a second function that does not correspond to the control flow, thus detecting whether the control flow is hijacked.

11. The method of claim 7, comprising:

when the control flow is a control flow in which one of two or more functions is called using a function pointer array, allocating different identifiers to the two or more functions, respectively, based on an index of the function pointer array, and determining whether an identifier of a function that does not correspond to an index of the function pointer array is called, thus detecting whether the control flow is hijacked.

12. The method of claim 7, comprising:

when the control flow is a control flow in which a function branches to one of two or more targets using a conditional branch statement, allocating different identifiers to the two or more targets, respectively, based on a conditional variable of the conditional branch statement, and determining whether an identifier of a target that does not correspond to the conditional variable of the conditional branch statement is called, thus detecting whether the control flow is hijacked.

* * * * *